March 1, 1927.
C. REINHARDT ET AL
1,619,763
MOVABLE DOLL EYES
Filed March 27, 1926
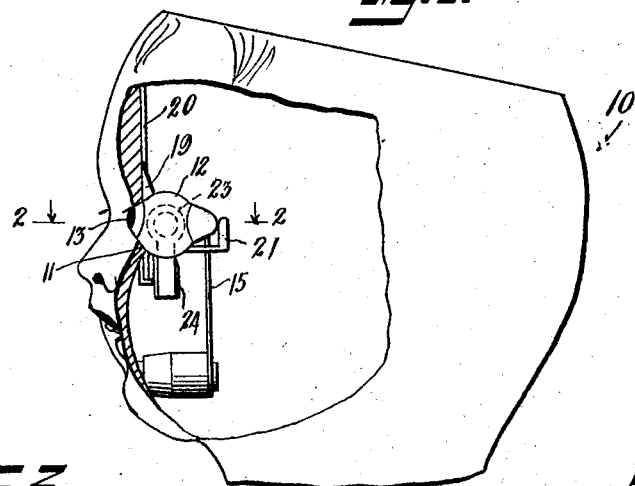
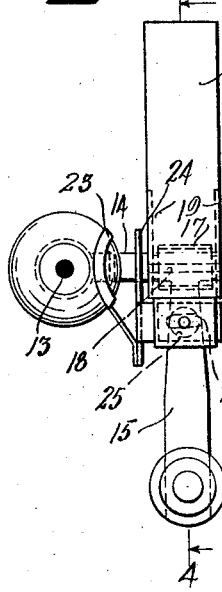
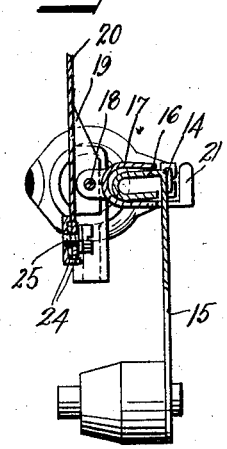
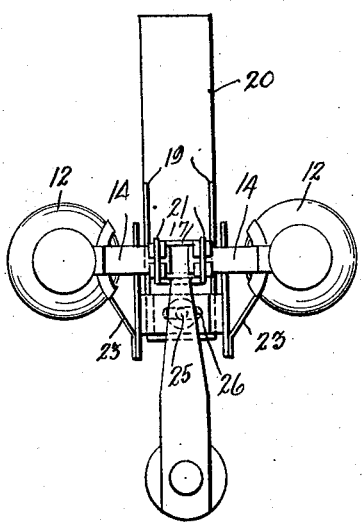
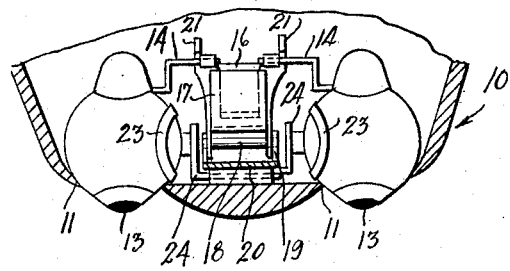
INVENTOR
Christian Reinhardt.
Bruno Pelz.
BY
ATTORNEY Patented Mar. 1, 1927.

1,619,763

UNITED STATES PATENT OFFICE.

CHRISTIAN REINHARDT AND BRUNO PELZ, OF NEW YORK, N. Y.

MOVABLE DOLL EYES.

Application filed March 27, 1926. Serial No. 97,843.

This invention relates to a doll eye mechanism which makes it possible and practical to use blown spherical glass eyes in a dollhead made out of wood flour composition or any composition that is subject to unevenness in manufacture, unevenness by contraction and inaccuracies in cutting out and fraising of the eye openings.

The heretofore known method of using plaster Paris to form bearings for blown spherical glass eyes has proven absolutely unsuccessful in a wood flour composition head on account of shrinkage of the head and for other reasons. A mounting of these eyes on a shaft or otherwise has also proven impractical for a blown spherical glass eye on account of its own inaccuracies in manufacture (no two are alike) and the above described unevenness in a dollhead can only work properly, when finding in its bearing its own centre over which it revolves notwithstanding the position the eye has to take to effect the proper appearance in the doll's face.

We have therefore invented and constructed an eye mounting for these blown spherical glass eyes which overcomes all the described difficulties and which allows these spheres to find and revolve over their own centre.

The main object of this invention is the provision of a doll's eye mounting having adjustable friction spring bearings which will allow the overcoming of the unevenness of the eye and also allow the eyes to find their own centre over which they revolve. A further object of these friction spring bearings is to amply allow to overcome any and all inaccuracies of the head, resulting in a smoothly operating eye mechanism, in which the eyes will always fit snugly in the eye openings, without leaving any noticeable space between the eye ball and the eye opening.

Another object of the invention is the provision of a doll's eye frame, in which the eyes cannot be accidentally displaced from their proper place.

A further object of the invention is the provision of a doll's eye frame, adapted to be inserted and fitted into place through the bottom of the head.

Other objects and novel features, in construction of our invention, will be apparent and fully described, as the specification proceeds.

In the drawings, forming a part of this specification,

Figure 1, is a side elevation of a doll's head, partly broken away, showing my invention as applied thereto.

Figure 2, is a section taken on line 2—2, Figure 1.

Figure 3, is a front view of the eye holding frame, with the eyes mounted therein.

Figure 4, is a section taken on line 4—4, Figure 3, and

Figure 5, is a rear view of the eye holding mechanism.

Referring to the drawings in detail, 10 indicates a doll's head, preferably made of wood flour composition or the like, having fraised eye openings, 11, through which protrude spherical eyes, 12, preferably made of blown glass, and having raised pupil portions, 13, at the front, and secured at the rear to arms, 14, secured to or integral with a weighted arm, 15, having a loop portion, 16, at its upper end loosely fitting in a carrier, 17, pivoted on a rod or pin, 18, journaled in ears, 19, of a frame member, 20, secured to the head, 10. Upwardly, projecting arms, 21, at the rear of the carrier, 17, act as means for preventing the eyes from falling out rearwardly, and the loop, 16, fitting in the carrier, 17, prevents them from falling out in any other direction. The eyes, 12, together with the weighted arm, 15, and eye carrier, 17, pivoted in the frame, 20, are yieldably and frictionally mounted in resilient spring bearings, 23, secured to brackets, 24, adjustably secured to the frame, 20, by means of a screw, 25, passing through slots, 26, in each of the brackets, 24, and threaded into the frame, 20.

It will readily be seen that with the construction just described, the distance between the eyes can be adjusted inwardly or outwardly, and the friction spring bearings will always exert an even pressure, allowing the eye balls to roll evenly and smoothly in the eye openings over their own centre and allow the raised pupil portion to pass the lower edge of the eye opening, without necessitating the allowance of any space between the eye ball and the edges of the eye openings. It will also be seen that due to the method of mounting the eyes in the spring bearings, any inaccuracies, in the fraising of the eye openings, will be taken up by the spring bearings.

From the foregoing, it will be seen that we have provided a spring bearing, eye mounting, mechanism, of simple, practical and inexpensive construction, that will overcome all inaccuracies due to shrinkage or poor workmanship, and work properly under all conditions, and prevent the eyes from being accidentally displaced from their sockets.

Having described our invention, what we claim as new, is:—

1. A movable eye mechanism for dolls, comprising a hanger, a carrier pivotally connected to said hanger, brackets adjustably associated with the hanger, a spring bearing on each of said brackets, a weighted arm, a pair of dolls' eyes secured to the arm and revolubly mounted and maintained in the spring bearings, a loop on the weighted arm, loosely mounted in the carrier, and projections on the carrier in the path of the arm to prevent the eyes from dropping out of the carrier.

2. A movable eye mechanism for dolls, comprising a hanger, a carrier pivotally connected to said hanger, a weighted arm, a loop on said arm loosely mounted in the carrier, spherical eyes secured to the weighted arm and a spring friction bearing member secured to each side of the hanger in which the eyes are revolvably mounted.

3. A movable eye mechanism for dolls, comprising a hanger, a carrier pivotally mounted on the hanger, a weighted arm loosely mounted in the carrier, a cupped friction spring bearing on each side of the hanger, and a pair of spherical eyes secured to the weighted arm and supported for rotation in the spring bearings.

4. In combination with a doll's head having eye openings, a hanger associated with the head, a carrier pivotally mounted on the hanger, a weighted arm loosely mounted in the carrier, a cupped and resilient bearing member on each side of the hanger and a pair of substantially spherical eyes on the weighted arm partly protruding through the eye openings with their inner surfaces rotatably supported in the bearings.

CHRISTIAN REINHARDT.
BRUNO PELZ.